US012152706B2

(12) United States Patent
Snow et al.

(10) Patent No.: US 12,152,706 B2
(45) Date of Patent: Nov. 26, 2024

(54) PIPE COUPLING

(71) Applicant: ABC TECHNOLOGIES INC., Toronto (CA)

(72) Inventors: James Dean Snow, Novi, MI (US); Jeffery S. Moore, LaSalle (CA); Kevin Theuma, Toronto (CA); Mo Xu, Thornhill (CA); Brian Sunley, Mississauga (CA)

(73) Assignee: ABC TECHNOLOGIES INC. (CA)

( * ) Notice: Subject to any disclaimer, the term of this patent is extended or adjusted under 35 U.S.C. 154(b) by 0 days.

(21) Appl. No.: 18/245,934

(22) PCT Filed: Sep. 20, 2021

(86) PCT No.: PCT/US2021/051092
§ 371 (c)(1),
(2) Date: Mar. 20, 2023

(87) PCT Pub. No.: WO2022/061229
PCT Pub. Date: Mar. 24, 2022

(65) Prior Publication Data
US 2023/0383874 A1 Nov. 30, 2023

Related U.S. Application Data

(60) Provisional application No. 63/158,415, filed on Mar. 9, 2021, provisional application No. 63/080,826, filed on Sep. 21, 2020.

(51) Int. Cl.
*F16L 15/08* (2006.01)
*F16L 15/00* (2006.01)

(52) U.S. Cl.
CPC ............. *F16L 15/008* (2013.01); *F16L 15/08* (2013.01)

(58) Field of Classification Search
CPC ....... F16L 15/008; F16L 15/08; F16L 19/005; F16L 19/0231; F16L 19/0283; F16L 27/125; F16L 27/1274
USPC .................................... 285/388, 387, 92, 224
See application file for complete search history.

(56) References Cited

U.S. PATENT DOCUMENTS

| 673,572 | A | * | 5/1901 | Barrow | .................... F16K 41/02 |
|---|---|---|---|---|---|
| | | | | | 285/92 |
| 846,704 | A | * | 3/1907 | Stucy | ...................... F16L 37/20 |
| | | | | | 285/90 |
| 944,877 | A | * | 12/1909 | Koschinski | ......... F16L 19/0206 |
| | | | | | 285/388 |
| 1,357,331 | A | | 11/1920 | Fauve | |
| 2,124,623 | A | | 7/1938 | Kurth | |

(Continued)

OTHER PUBLICATIONS

Written Opinion and International Search Report issued Dec. 29, 2021 in Intl Appl. No. PCT/US21/51092.

*Primary Examiner* — David Bochna
(74) *Attorney, Agent, or Firm* — McDonald Hopkins LLC (57) ABSTRACT

A coupling for interconnecting a first pipe element and a second pipe element. The coupling comprises a first coupling member on the first pipe element, and a second coupling member on the second pipe element. The second coupling member is dimensioned to receive therein the first coupling member. The coupling also includes a retainer element having threads to engage the first coupling member to retain the first and second coupling members in a coupled state. The retainer element includes a lock feature to prevent inadvertent loosening rotation.

18 Claims, 13 Drawing Sheets

(56) References Cited

U.S. PATENT DOCUMENTS

| | | | | |
|---|---|---|---|---|
| 2,421,691 A * | 6/1947 | Gibson, Jr. | ............ | F16L 27/047 285/91 |
| 2,491,406 A * | 12/1949 | Zeeb | ................ | F16L 19/005 411/326 |
| 2,789,844 A | 4/1957 | Kessler | | |
| 3,069,187 A * | 12/1962 | Collims | ................ | F16L 19/005 285/85 |
| 3,199,876 A | 8/1965 | Magos et al. | | |
| 3,596,934 A * | 8/1971 | De Cenzo | ............ | F16L 27/1274 285/55 |
| 4,621,841 A | 11/1986 | Wakefield | | |
| 5,215,336 A * | 6/1993 | Worthing | ............. | F16L 19/005 411/937 |
| 5,290,075 A * | 3/1994 | Allread | ................. | F16L 27/047 285/261 |
| 6,460,898 B1 * | 10/2002 | Chieh | ................... | F16L 27/023 285/92 |
| 6,460,901 B2 | 10/2002 | Rochelle | | |
| 6,578,881 B2 * | 6/2003 | Lynn | ................ | H01J 37/3435 285/387 |
| 7,331,612 B2 | 2/2008 | Frost et al. | | |
| 8,157,295 B2 * | 4/2012 | Krywitsky | ............. | F16L 27/06 285/271 |
| 8,807,572 B2 | 8/2014 | McCarthy | | |
| 8,840,152 B2 | 9/2014 | Carcagno et al. | | |
| 9,803,783 B2 | 10/2017 | Zulauf et al. | | |
| 10,001,231 B2 | 6/2018 | Eilert et al. | | |
| 10,060,562 B2 | 8/2018 | Berlusconi | | |
| 10,060,563 B2 | 8/2018 | Campbell et al. | | |
| 10,072,777 B2 | 9/2018 | Vigre | | |
| 10,132,432 B2 | 11/2018 | Aramaki et al. | | |
| 10,184,599 B2 | 1/2019 | Bird et al. | | |
| 10,364,922 B2 | 7/2019 | Jung | | |
| 10,393,294 B2 | 8/2019 | Ungchusri et al. | | |
| 10,393,295 B2 | 8/2019 | Kato | | |
| 10,480,696 B2 * | 11/2019 | Leeth | .................... | F16L 19/005 |
| 10,550,968 B2 | 2/2020 | Nagura et al. | | |
| 10,655,762 B2 | 5/2020 | Caroll et al. | | |
| 10,663,094 B2 | 5/2020 | Braathen | | |
| 10,683,953 B2 | 6/2020 | Shemtov et al. | | |
| 10,711,926 B2 | 7/2020 | Mickelson | | |
| 10,774,960 B2 | 9/2020 | Nguyen et al. | | |
| 10,808,871 B2 | 10/2020 | Nguyen | | |
| 11,035,505 B2 | 6/2021 | Clapper et al. | | |
| 11,041,566 B2 | 6/2021 | Hiramatsu et al. | | |
| 11,143,339 B2 | 10/2021 | Dirneder | | |
| 11,174,972 B2 | 11/2021 | Okita et al. | | |
| 11,181,214 B2 | 11/2021 | Puckett et al. | | |
| 11,187,355 B2 | 11/2021 | Gauss et al. | | |
| 11,187,356 B2 * | 11/2021 | Potier | ................ | F16L 19/0231 |
| 11,262,013 B2 | 3/2022 | Tom et al. | | |
| 11,306,850 B2 | 4/2022 | Choi | | |
| 2005/0040652 A1 * | 2/2005 | Legeai | .................. | F16L 19/086 285/376 |
| 2018/0172187 A1 * | 6/2018 | Leys | ....................... | F16L 15/08 |

\* cited by examiner

PIPE COUPLING

CROSS-REFERENCE TO RELATED APPLICATIONS

This application claims the benefit of U.S. Provisional Application No. 63/080,826, filed Sep. 21, 2020, and U.S. Provisional Application No. 63/158,415, filed Mar. 9, 2021, each of which is hereby incorporated by reference in its entirety for all purposes.

FIELD

The present invention pertains to pipe couplings, and in particular to an agile pipe coupling that permits for limited longitudinal and angular displacement during use.

BACKGROUND

The automotive engine compartment is a complex environment with limited real estate available for the required components in a modern high efficiency engine. A particular challenge arises for the air induction system, which requires a network of air induction conduits that can withstand the various operational conditions of the engine. In particular, the air induction system is subject to certain degrees to movement, placing a general strain upon the system.

The conduit network of the air induction system typically employs connectors to facilitate assembly of the individual components. Connectors of the quick-connect variety are especially useful, as they aid in the assembly of the system by providing a simple press fit connection. Connectors of this type are known, but are often provided as separate structures that are added to conduits during the assembly process. This adds additional steps to the assembly process, increasing process complexity and overall assembly time.

Accordingly, there is a need for a connector of the quick-connect variety that is simpler in construction, easy to use, and provides a degree of articulation to accommodate motions in the engine compartment during use.

SUMMARY

According to a first embodiment hereof, the present disclosure provides a coupling for interconnecting a first pipe element and a second pipe element. The coupling includes a first coupling member on the first pipe element, a second coupling member on the second pipe element, and a retainer element. The second coupling member is dimensioned to receive therein the first coupling member. The retainer element has threads to engage the first coupling member to retain the first and second coupling members in a coupled state. The retainer element includes a lock feature to prevent inadvertent loosening rotation.

In an aspect of the first embodiment, and in combination with any other aspects herein, the disclosure provides that the first coupling member includes a socket and the second coupling member includes a plug. In an aspect of the first embodiment, and in combination with any other aspects herein, the disclosure provides that the coupling also includes an annular sealing element that includes a sealed interface between the socket and the plug. In an aspect of the first embodiment, and in combination with any other aspects herein, the disclosure provides that the arrangement of the plug within the socket and the dimensional characteristics of each of these features is such that the second pipe element is permitted a limited amount of longitudinal and angular movement relative to the first pipe element. In an aspect of the first embodiment, and in combination with any other aspects herein, the disclosure provides that the coupling further includes a secondary sealing element positioned between an enlarged segment of the plug and an inner surface of the socket.

In an aspect of the first embodiment, and in combination with any other aspects herein, the disclosure provides that the first coupling member is integrally formed with the first pipe element, and the second coupling member is integrally formed with the second pipe element.

In an aspect of the first embodiment, and in combination with any other aspects herein, the disclosure provides that the threads of the retainer element engage cooperating threads on an inside surface of a retainer lock wall of the first coupling member.

In an aspect of the first embodiment, and in combination with any other aspects herein, the disclosure provides that the retainer element is a split retainer that includes a first retainer portion and a second retainer portion. In an aspect of the first embodiment, and in combination with any other aspects herein, the disclosure provides that the first and second retainer portions include alignment features to facilitate assembly of the retainer element about the second pipe element. In an aspect of the first embodiment, and in combination with any other aspects herein, the disclosure provides that the alignment features include at least one alignment boss on the first retainer portion, and a corresponding alignment pocket on the second retainer portion. In an aspect of the first embodiment, and in combination with any other aspects herein, the disclosure provides that the retainer element includes a fastening barb and a cooperating barb receiver at each interface between the first and second retainer portions.

In an aspect of the first embodiment, and in combination with any other aspects herein, the disclosure provides that the lock feature includes at least one pawl on the retainer element. The at least one pawl is arranged to lockingly engage respective lock teeth on a terminal end of the first coupling member. In an aspect of the first embodiment, and in combination with any other aspects herein, the disclosure provides that the retainer element includes a release tab to facilitate releasing the pawl from the respective lock teeth. In an aspect of the first embodiment, and in combination with any other aspects herein, the disclosure provides that a positive stop limits the extent of flex during depression of the release tab.

In an aspect of the first embodiment, and in combination with any other aspects herein, the disclosure provides that the coupling also includes a dust seal to prevent the ingress of dust or debris into the coupling. In an aspect of the first embodiment, and in combination with any other aspects herein, the disclosure provides that the dust seal is configured as a two-part split seal. The two-part seal includes a first dust seal portion and a second dust seal portion, and the first and second dust seal portions are arranged to assemble around the second pipe element. In an aspect of the first embodiment, and in combination with any other aspects herein, the disclosure provides that the dust seal includes at least one alignment boss that aligns to a corresponding alignment pocket on the retainer element.

In an aspect of the first embodiment, and in combination with any other aspects herein, the disclosure provides that the lock feature includes at least one protuberance on the retainer element. The at least one protuberance is arranged to engage a respective ramped stop on a terminal end of the first coupling member.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Specific embodiments of the present disclosure will now be described with reference to the Figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Figure 1:
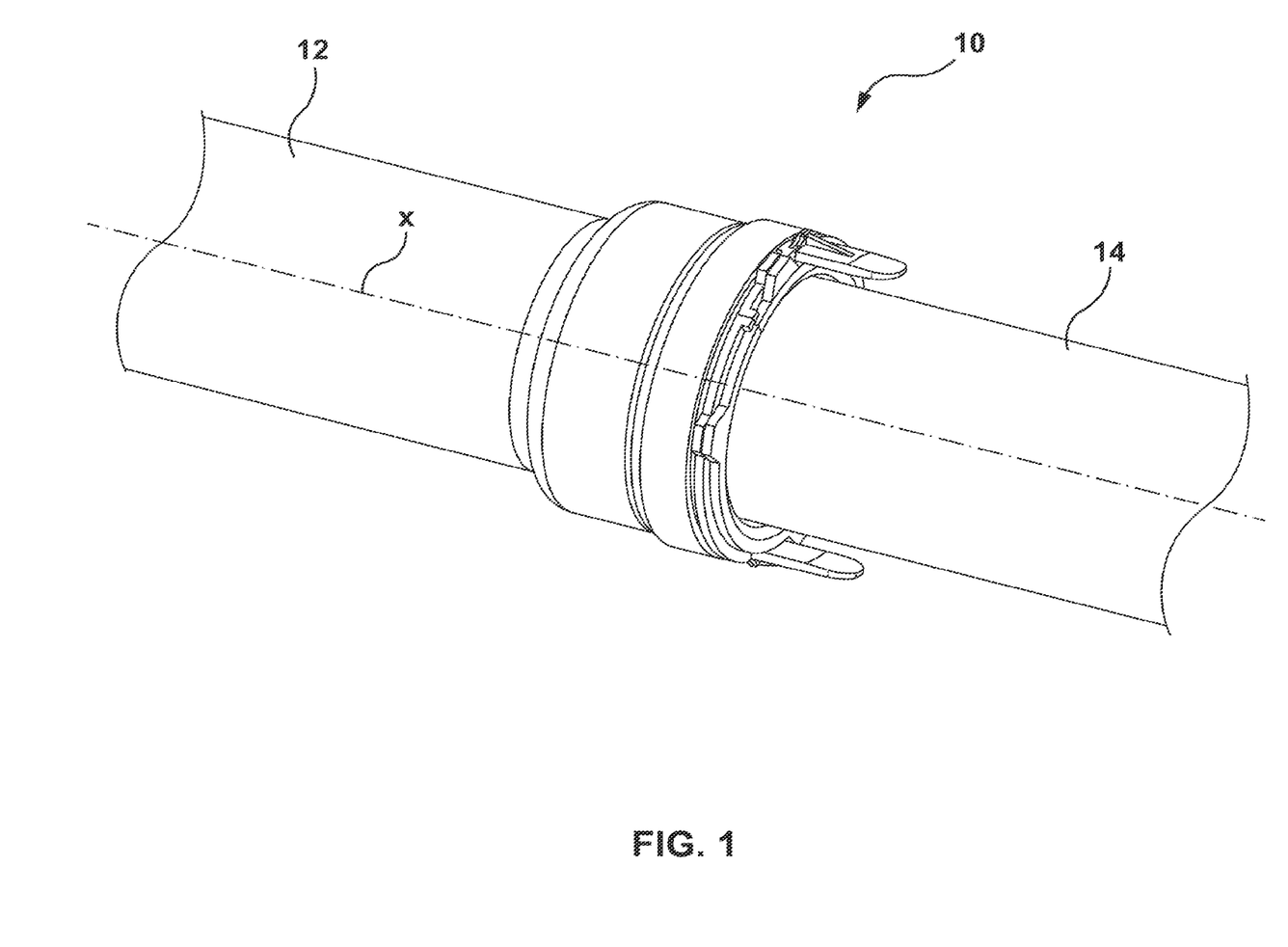
FIG. 1 illustrates a perspective view of a coupling for interconnecting first and second pipe elements.
Figure 2:
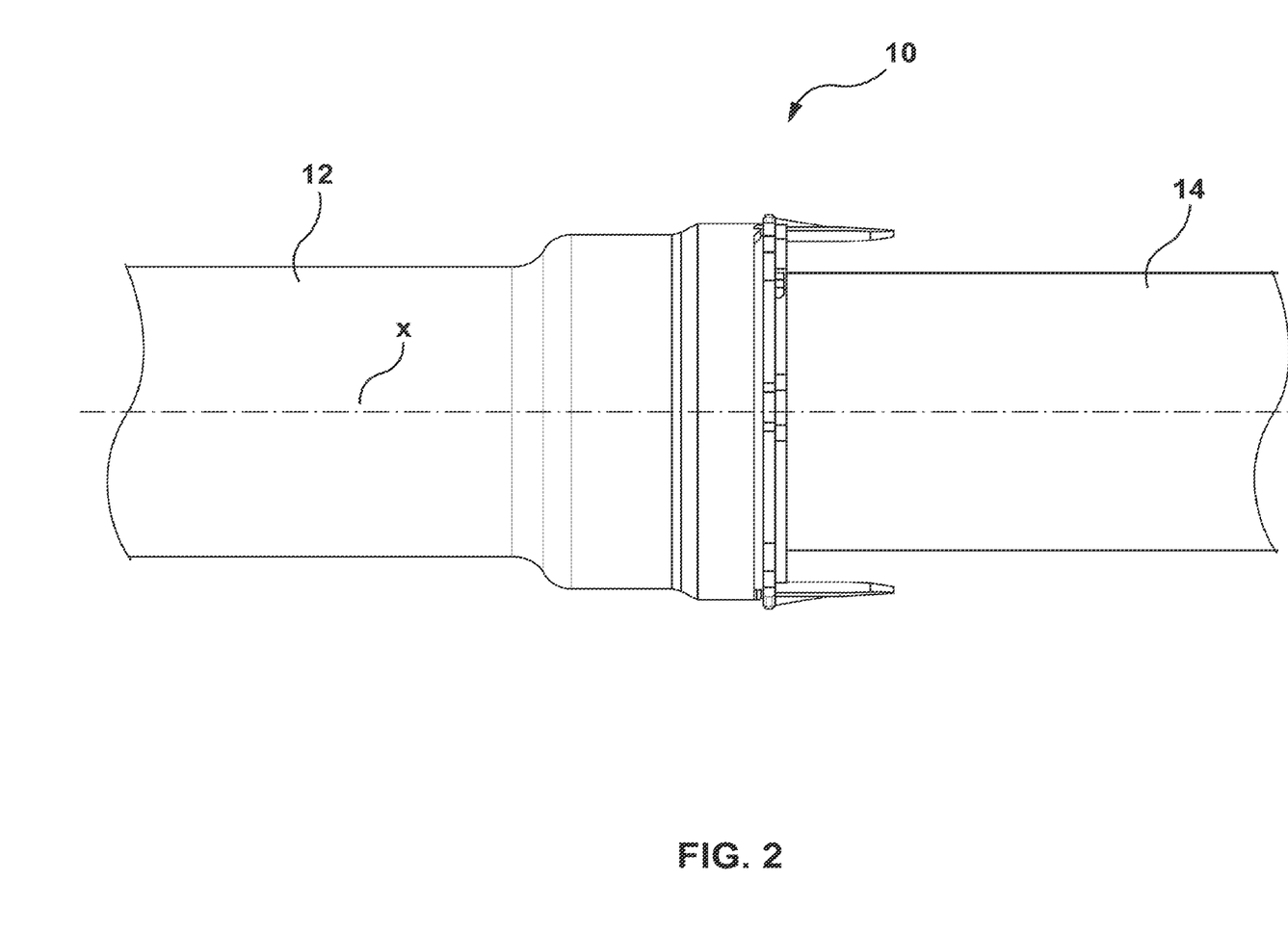
FIG. 2 illustrates a side view of the coupling according to the embodiment of FIG. 1.

The coupling 10 shown in FIGS. 1 and 2 serves to interconnect a first pipe element 12 and a second pipe element 14, which are generally coaxial with respect to an axis X. Having regard to FIG. 3, the first pipe element 12 includes at a terminal end 16 a first coupling member 18, while the second pipe element 14 includes at a terminal end 20 a second coupling member 22. The first coupling member 18 is shown in the form of a female socket 24, while the second coupling member 22 is shown in the form of a cooperating male plug 26. The socket 24 is dimensioned to receive therein the plug 26, thus achieving in an assembled state a fluid communication between the first and second pipe elements 12, 14. In the embodiment shown, the first and second coupling members 18, 22 are integrally formed (i.e. molded) to the respective first and second pipe elements 12, 14. It will be appreciated that in some embodiments, the first and second coupling members 18, 22 may be separately formed, and subsequently attached to the respective first and second pipe elements 12, 14.

Figure 4:
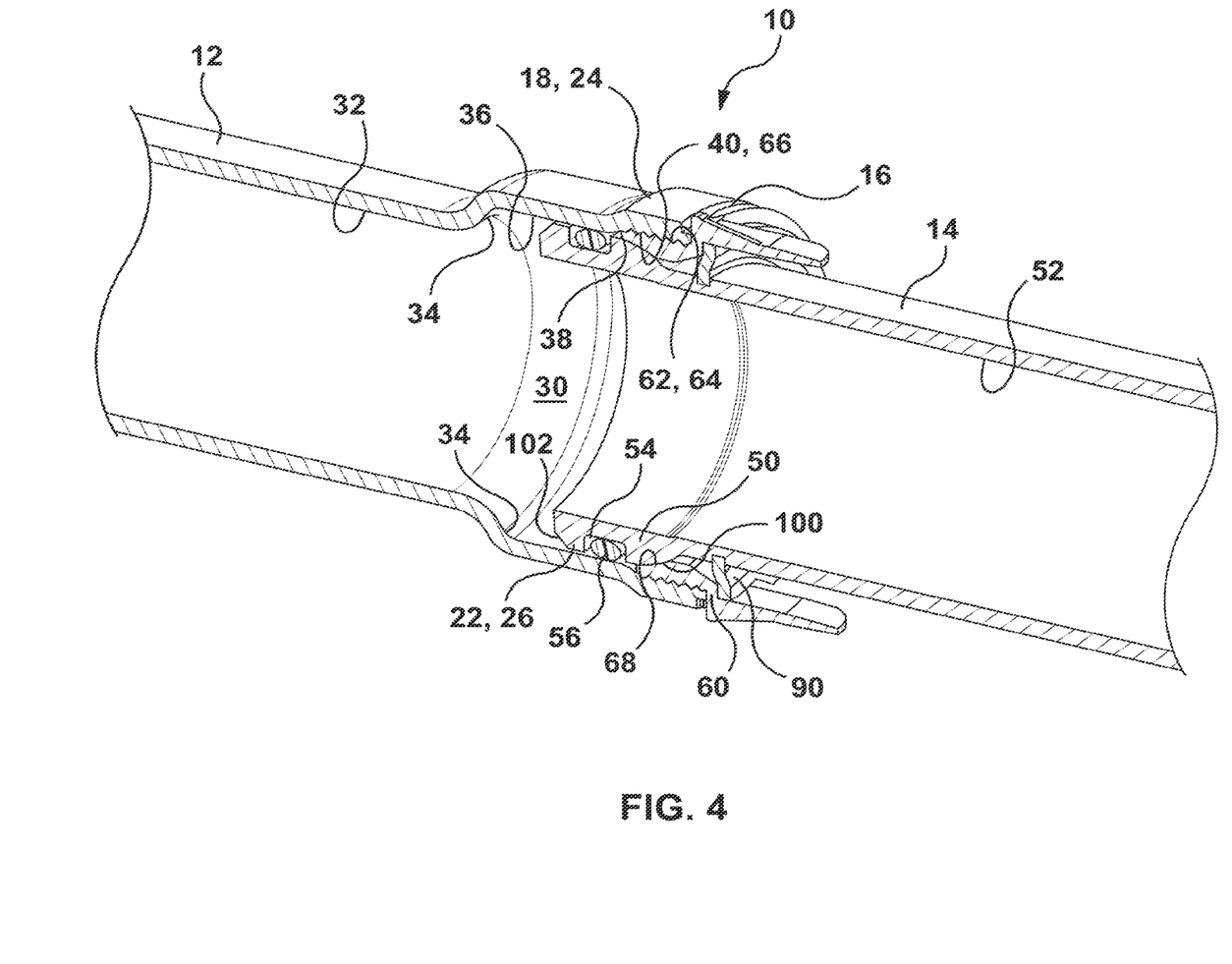
FIG. 4 illustrates a sectioned perspective view of the coupling according to the embodiment of FIG. 1, the coupling shown in an extended configuration regarding longitudinal displacement of the second pipe element relative to the first pipe element.

With reference now to FIG. 4, the socket 24 on the first coupling member 18 includes a cylindrical cavity 30 located adjacent a first cylindrical portion 32 of the first pipe element 12. The cylindrical cavity 30 includes a first divergent frustoconical wall 34, a second cylindrical portion 36, second divergent frustoconical wall 38, and a retainer lock wall 40. The first and second frustoconical walls 34, 38 demarcate respective regions where the inside diameter of the first pipe element 12 increases between adjacent wall portions, in the direction towards the terminal end 16.

Continuing with FIG. 4, the plug 26 on the second coupling member 22 includes towards the terminal end 20 an enlarged segment 50 having regard to wall thickness relative to the adjacent third cylindrical portion 52 of the second pipe element 14. The enlargement of the enlarged segment 50 is on the exterior side of the second coupling member 22, that is the inside diameter through the second pipe element 14 in the region of the second coupling member 22 remains constant, while the outside diameter is increased in the region of the enlarged segment 50. The enlarged segment 50 includes a circumferential channel 54 on an outer surface thereof, the channel 54 being configured to receive an annular sealing element 56. The annular sealing element 56 serves to provide a sealed interface between the socket 24 and the plug 26. More specifically, the annular sealing element 56 is radially compressed between the plug 26 at the circumferential channel 54, and the socket 24 at the second cylindrical portion 36, therein establishing fluid communication between the first and second pipe elements 12, 14 with minimal egress/ingress of gases/liquids therefrom. In the embodiment shown, the inside diameters of the first and second pipe elements 12, 14 are approximately the same, so as to avoid an internal pressure drop through the coupling 10.

Figure 3:
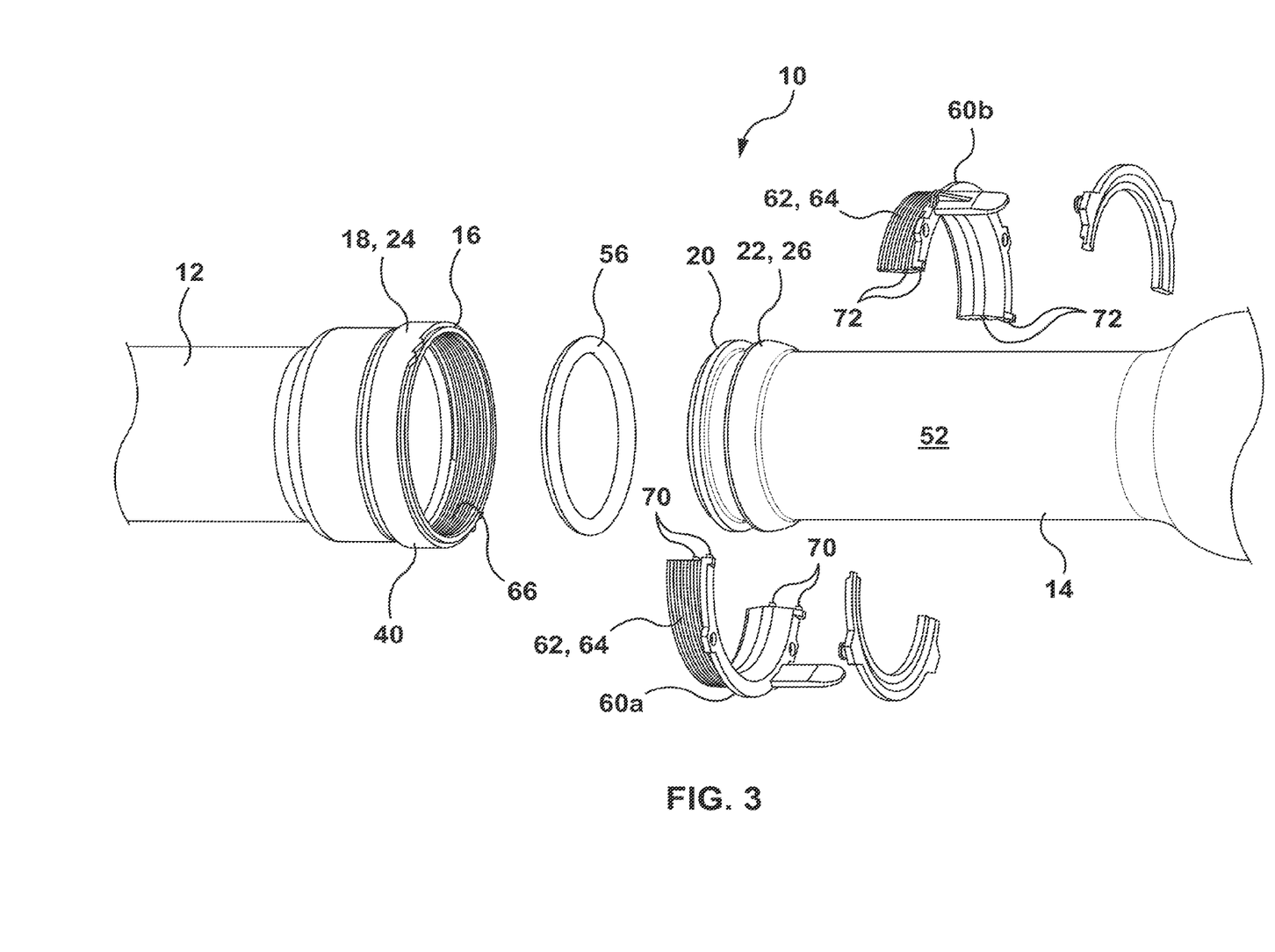
FIG. 3 illustrates an exploded view of the coupling according to the embodiment of FIG. 1.

The enlarged segment 50 also cooperates with a retainer element 60 to prevent inadvertent removal of the plug 26 from the socket 24. As shown, the retainer element 60 includes a retainer surface 62 having a series of threads 64 for threaded engagement with cooperating threads 66 on an inside surface of the retainer lock wall 40. The retainer element 60 also includes a retainer bearing surface 68 that serves as a longitudinal displacement stop for the plug 26, as will be described in greater detail below. As best seen in FIG. 3, the retainer element 60 is a split retainer, including a first retainer portion 60a and a second retainer portion 60b that assemble around the third cylindrical portion 52 of the second pipe element 14, and cooperate in the assembled state to thread upon the threads 66 of the retainer lock wall 40. The first and second retainer portions 60a, include alignment features to facilitate assembly about the third cylindrical portion 52. The first retainer portion 60a includes at least one alignment boss 70, that aligns to and seats within a corresponding alignment pocket 72 on the second retainer portion 60b. The embodiment shown includes two alignment features at each interface between the first and second retainer portions 60b. Once assembled on the third cylindrical portion 52, the retainer element 60 can be slid longitudinally towards the retainer lock wall 40, and rotated to engage the threads 64, 66 provided therebetween.

Figure 5:
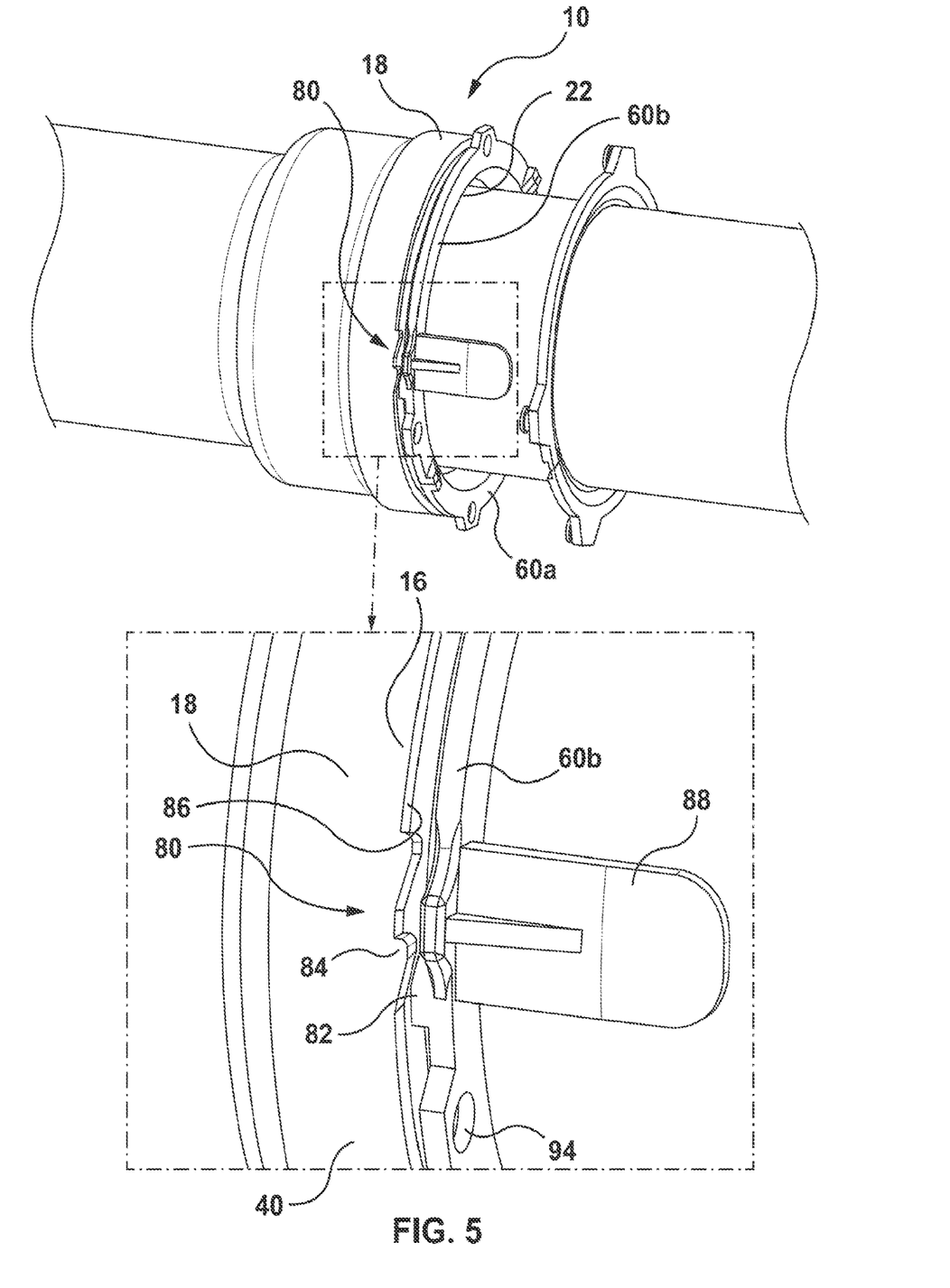
FIG. 5 illustrates an enlarged detailed view of a lock feature on the retainer element of the coupling according to the embodiment of FIG. 1, the lock feature shown in a disengaged state.
Figure 6:
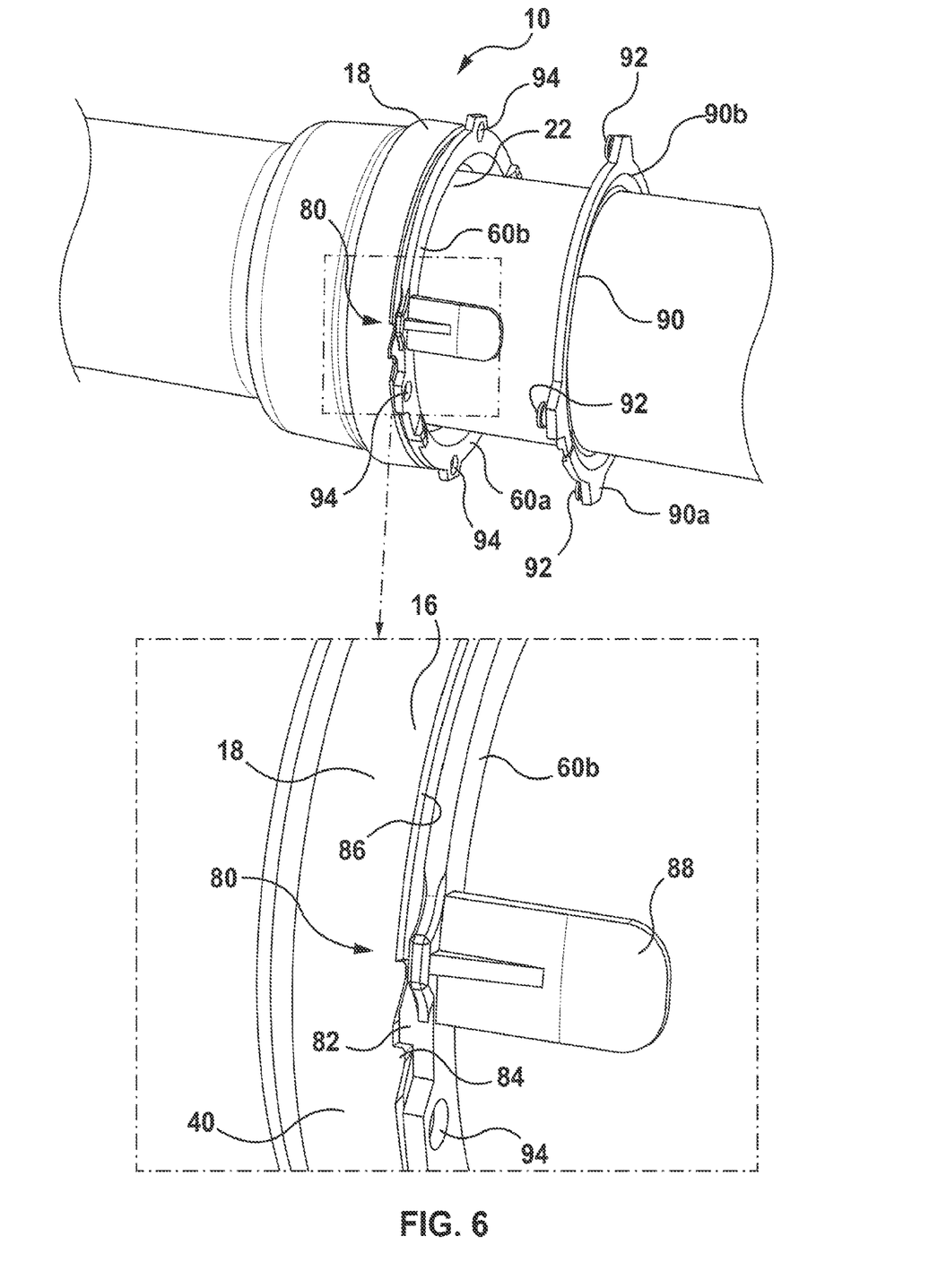
FIG. 6 illustrates an enlarged detailed view of a lock feature on the retainer element of the coupling according to the embodiment of FIG. 1, the lock feature shown in an engaged state.
Figures 7A, 7B:
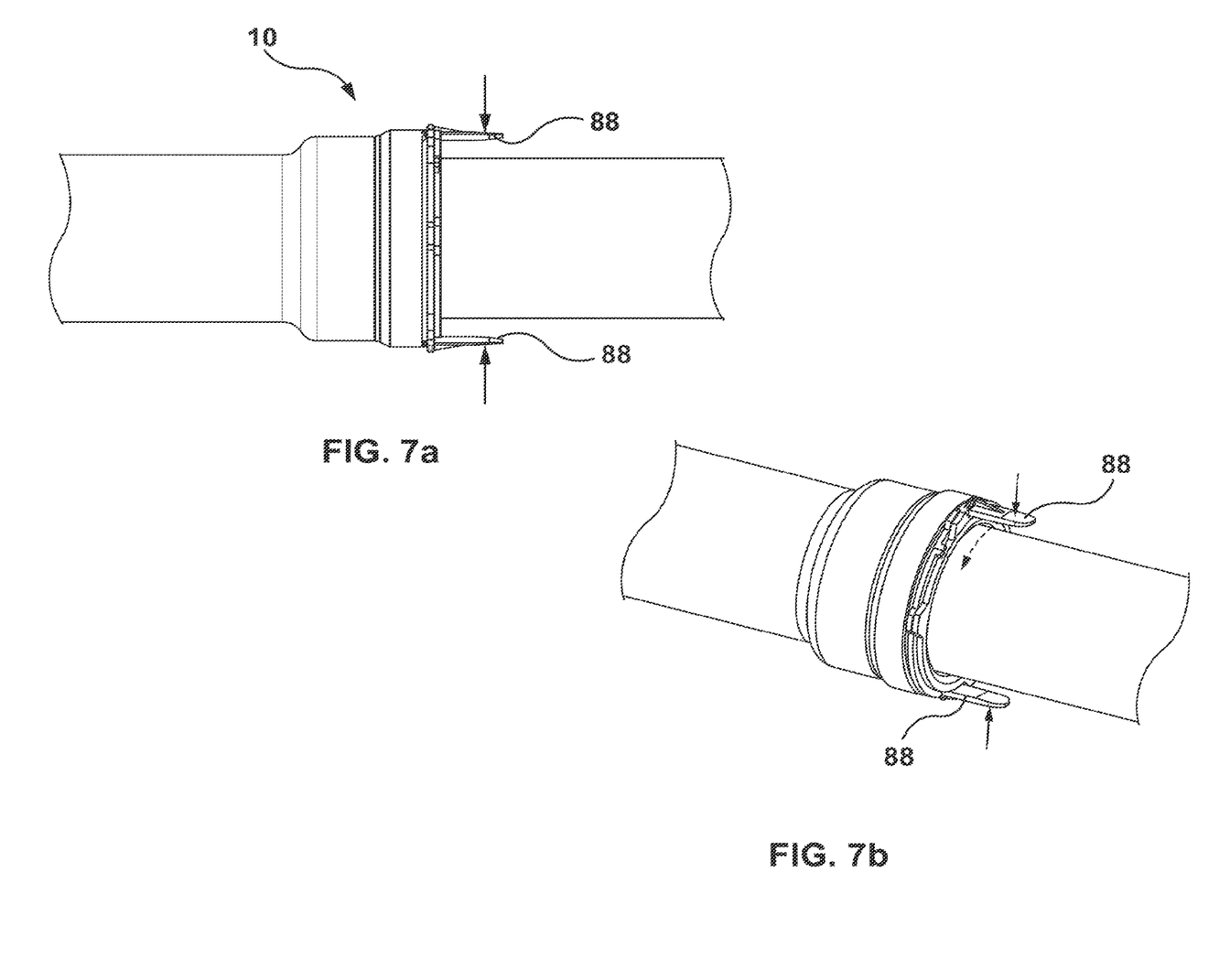
FIGS. 7a and 7b illustrate the action required to disengage the lock feature on the retainer element of the coupling according to the embodiment of FIG. 1.

With reference now to FIGS. 5 and 6, each of the first and second retainer portions 60a, 60b include a respective lock feature 80 (only one visible in the referenced figures). The lock feature serves to prevent inadvertent loosening rotation once the first and second coupling members 18, 22 are fully assembled (coupled). As shown, the lock feature 80 includes a pawl 82 configured to engage one or more lock teeth 84 on the terminal end 16 of the first coupling member 18. More specifically, the one or more lock teeth 84 are arranged on an end face 86 of the terminal end 16 that forms the retainer lock wall 40. During tightening rotation of the retainer element 60 onto the threads 66 of the retainer lock wall 40, the pawl 82 on each of the first and second retainer portions 60a, 60b are drawn longitudinally towards the terminal end 16 of the first coupling member 18, thereby causing the pawls 82 to lockingly engage the respective lock teeth 84 (as shown in FIG. 6). In this way, the retainer element 60 is prevented from rotating in the opposite (loosening) direction, thereby avoiding inadvertent loosening/detachment of the retainer element from the retainer lock wall 40. To release the retainer element 60, for example during repair/maintenance, a release tab 88 is included on each of the first and second retainer portions 60a, 60b proximal the pawl 82. On depressing the release tab 88 as shown in FIGS. 7a and 7b, the release tab 88 flexes the retainer portions sufficiently to release the pawl 82 from the lock teeth 84. On releasing the pawl 82 from the lock teeth 84, the retainer element 60 may be rotated in the loosening direction, permitting for disassembly. To prevent damage to the release tab 88 through over extension when being flexed to release the pawl 82, a suitable positive stop may be added to either the underside of the release tab 88, or as an extension of the retainer portion 60. In this way, the release tab 88 is permitted to flex only sufficiently to permit release of the pawl 82, without risk of breakage of the release tab 88 from the retainer portion structure.

The embodiment shown additionally includes a dust seal 90 to reduce the ingress of dust/debris into the joint. The dust seal 90 is configured as a two-part split seal, including a first dust seal portion 90a and a second dust seal portion 90b. The first and second dust seal portions 90b are configured to assemble around the third cylindrical portion 52 of the second pipe element 14, and cooperate in the assembled state to locate against the retainer element 60 to seal the opening formed between the retainer element 60 and the third cylindrical portion 52 of the second pipe element 14. To maintain the dust seal 90 in position, each seal portion 90a, 90b includes at least one alignment boss 92 that aligns to and is received by a corresponding alignment pocket 94 included on each of the first and second retainer portions 60a, 60b of the retainer element As shown, each seal portion 90a, 90b is retained in position by two alignment bosses 92. Additionally, the assembly of the dust seal 90 may be retained in position relative to the retainer element 60 through a manual snap-fit or interference-fit, or the dust seal 90 may be process overmolded to the retainer element 60.

Figure 8:
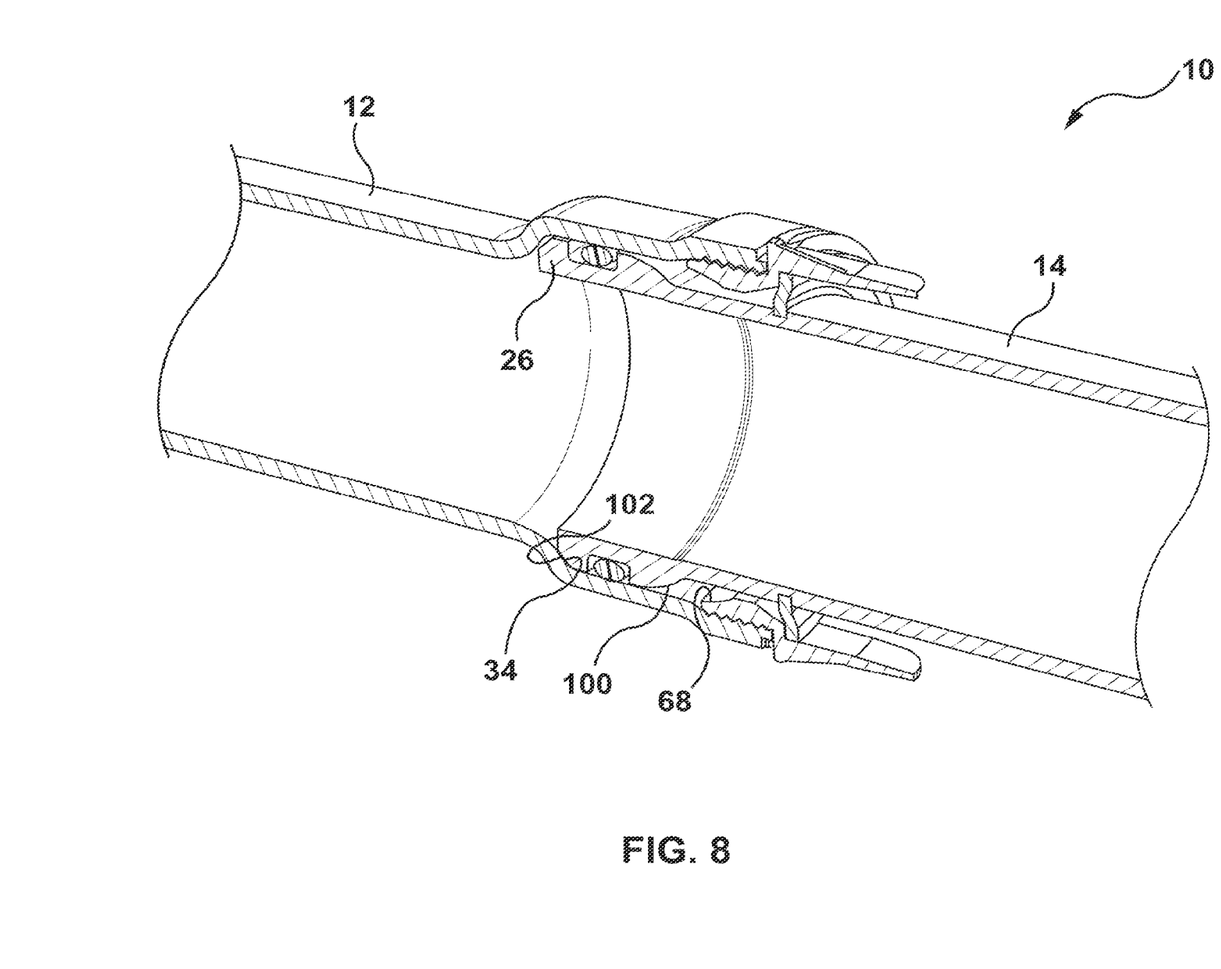
FIG. 8 illustrates a sectioned perspective view of the coupling according to the embodiment of FIG. 1, the coupling shown in a retracted configuration regarding longitudinal displacement of the second pipe element relative to the first pipe element.

The arrangement of the plug 26 within the socket 24 and the dimensional characteristics of each of these features is such that the second pipe element 14 is permitted a limited amount of longitudinal and angular movement relative to the first pipe element 12. With reference to FIG. 4, the second pipe element 14 is shown in a first position including one limit of longitudinal displacement relative to the first pipe element 12. In this arrangement, a first bearing face 100 formed as part of the plug 26 engages the retainer bearing surface 68 of the retainer element 60. Also in this arrangement, it is evident that a gap or spacing is defined between a second bearing face 102 and the first divergent frustoconical wall 34 of the cylindrical cavity 30 of the first pipe element 12. This spacing is the extent of longitudinal displacement permitted by the coupling 10 during operation. With reference to FIG. 8, the second pipe element 14 is shown in a second position including the second limit of longitudinal displacement relative to the first pipe element 12. In this arrangement, the second bearing face 102 engages the first divergent frustoconical wall 34 of the cylindrical cavity 30 of the first pipe element 12. The previously noted gap or spacing is now defined between the retainer bearing surface 68 and the first bearing face 100 of the plug 26. During use, the coupling 10 may dynamically adjust within these longitudinal limits and among multiple axes to accommodate movement/vibration arising from the operating environment.

Figure 9:
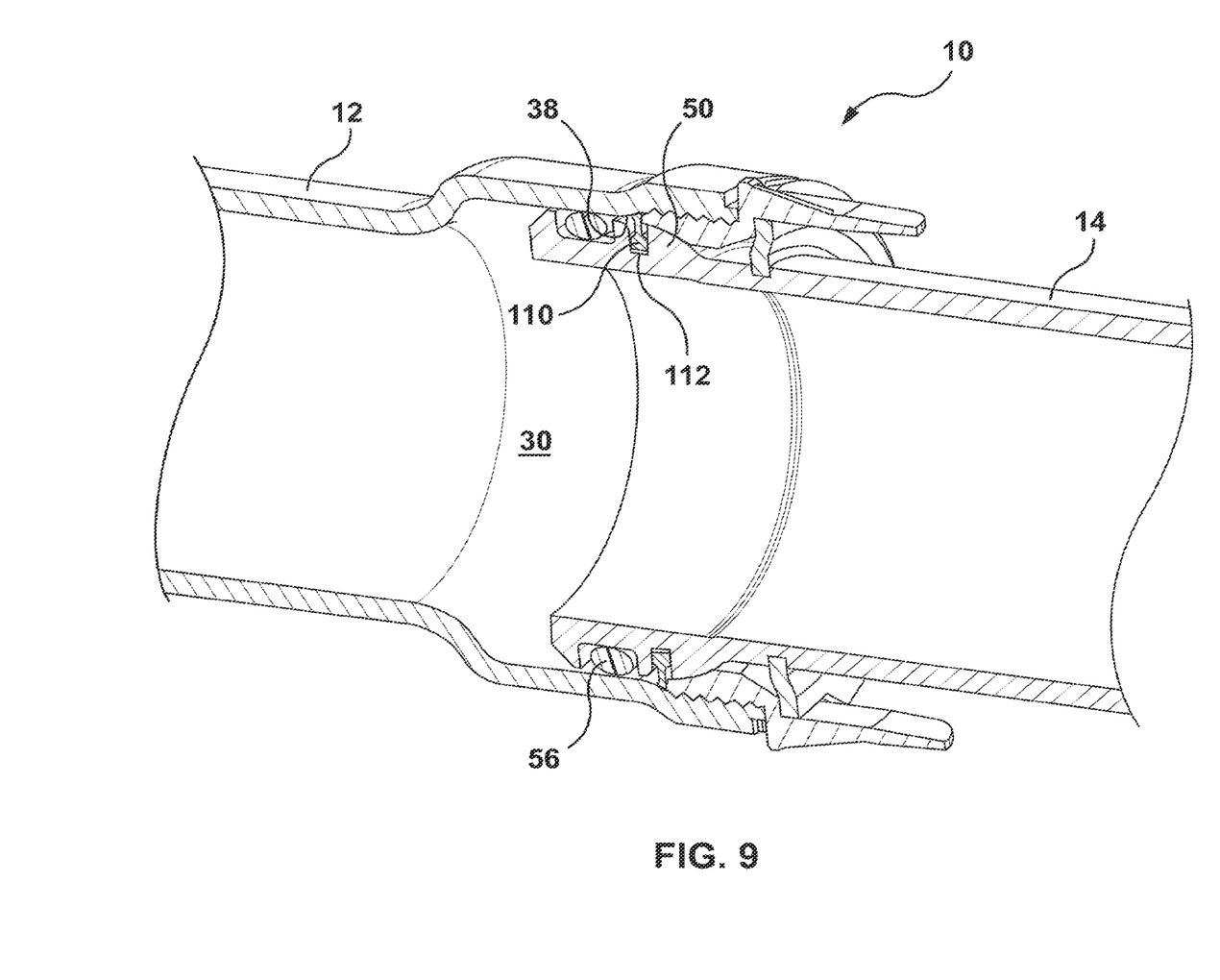
FIG. 9 illustrates a sectional perspective view of an alternative coupler embodiment, the coupler having a secondary sealing element.

It will be appreciated that the coupling 10 as detailed in the embodiment presented above may include additional or alternative structural features to modify or enhance coupling and/or sealing performance. For instance, with reference to FIG. 9, the coupling 10 is shown to include a secondary annular sealing element 110. The annular sealing element 110 is positioned within a corresponding secondary channel 112 located on the outer surface of the enlarged segment 50. The annular sealing element 110 is configured to extend radially outwards sufficiently to engage and seal against the inside surface of the second frustoconical wall 38, there in providing a secondary sealing function between the enlarged segment 50 of the plug, and the inner surface of the cylindrical cavity 30 of the socket, in addition to that provided by the annular sealing element 56.

Figure 10:
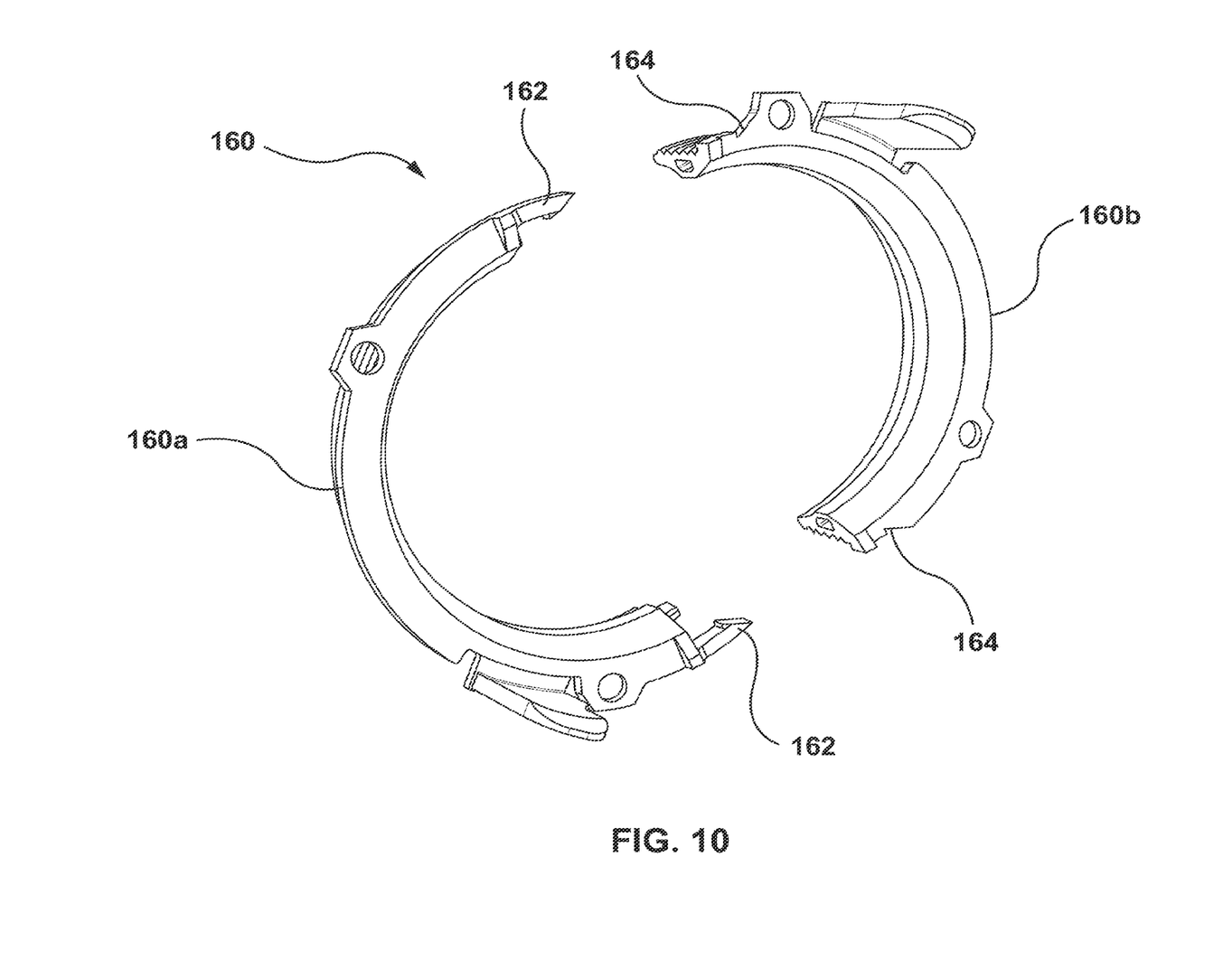
FIG. 10 illustrates an exploded perspective view of an alternative retainer element in isolation, that includes the addition of fastening barbs.
Figure 11:
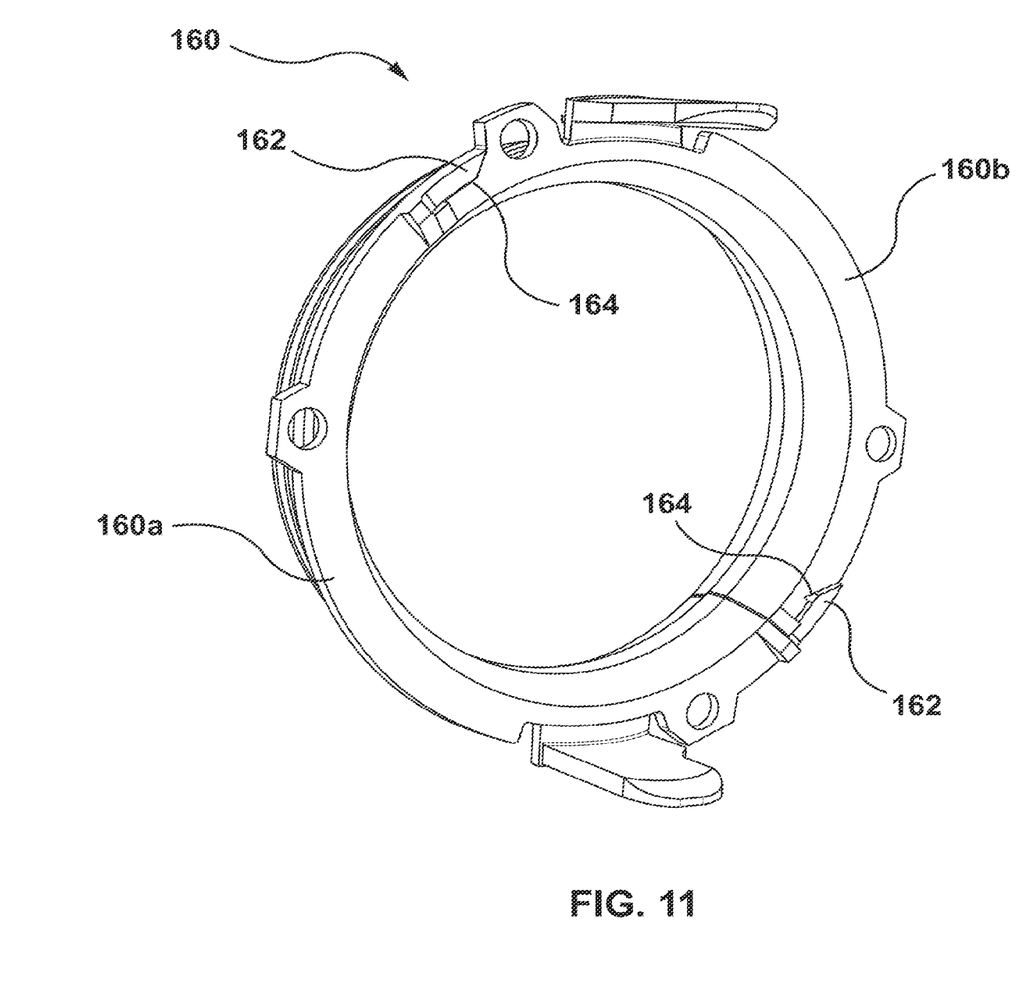
FIG. 11 illustrates the alternative retainer element according to the embodiment of FIG. 10, again in isolation and in an assembled state.

With reference to FIGS. 10 and 11, shown is a retainer element 160 in isolation, according to second embodiment. The retainer element 160 is configured in much the same way as the retainer element 60 discussed above. Accordingly, only differences will be noted. As shown, the retainer element 160 is a split retainer, including a first retainer portion 160a and a second retainer portion 160b. In addition to the various features noted above with reference to the retainer element the retainer element 160 includes a fastening barb 162 and cooperating barb receiver 164 at each interface between the first and second retainer portions 160a, 160b. As shown, the fastening barbs 162 at each interface are both included on the first retainer portion 160a. It will be appreciated that this is merely exemplary, as the fastening barbs 162 may be arranged with one on each of the first and second retainer portions 160a/b, with the cooperating barb receivers 164 included on the opposing retainer portions.

Figure 12:
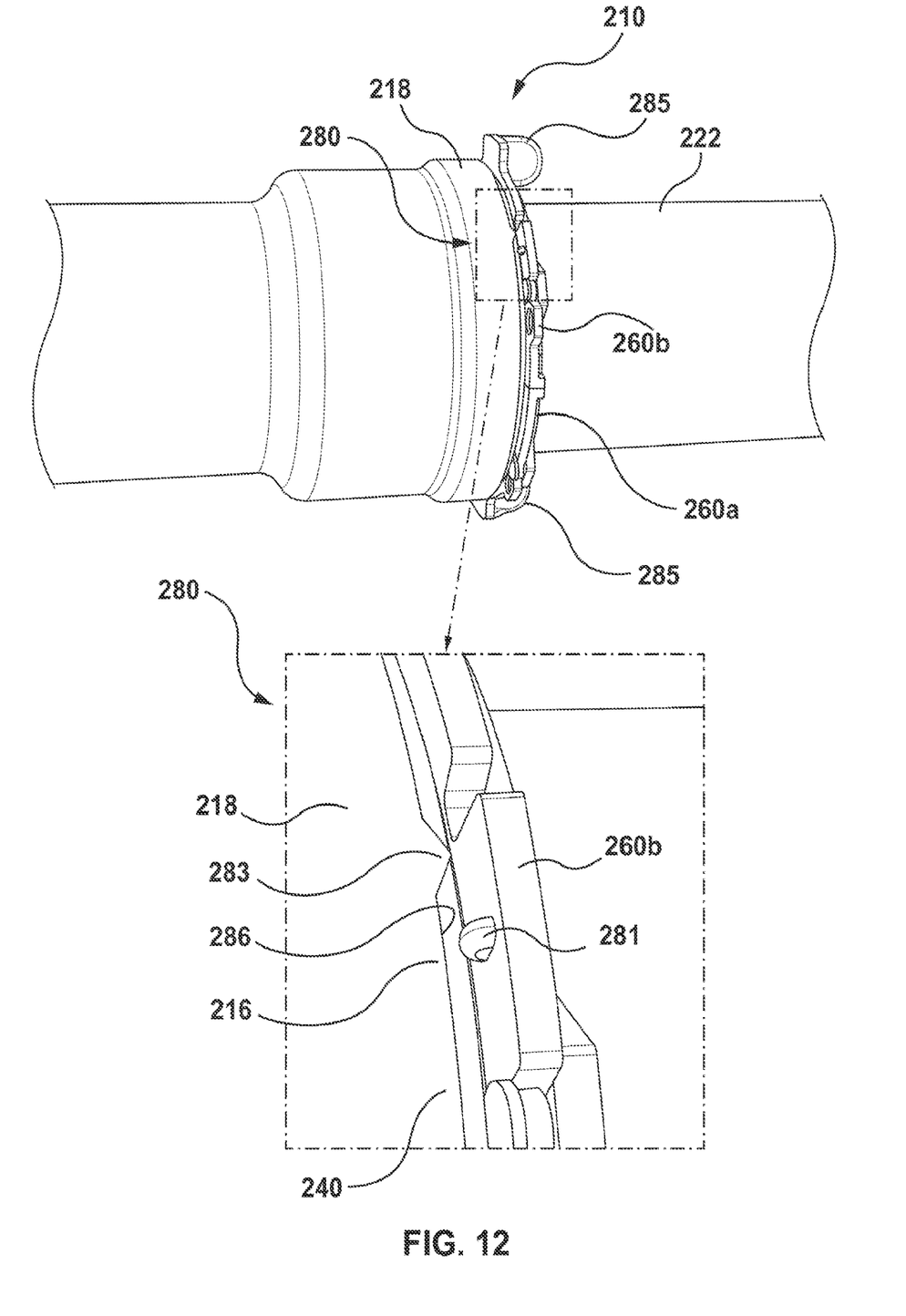
FIG. 12 illustrates an enlarged detailed view of an alternative lock feature suitable for use on a coupling similar to the embodiment of FIG. 1, the lock feature shown in a disengaged state.
Figure 13:
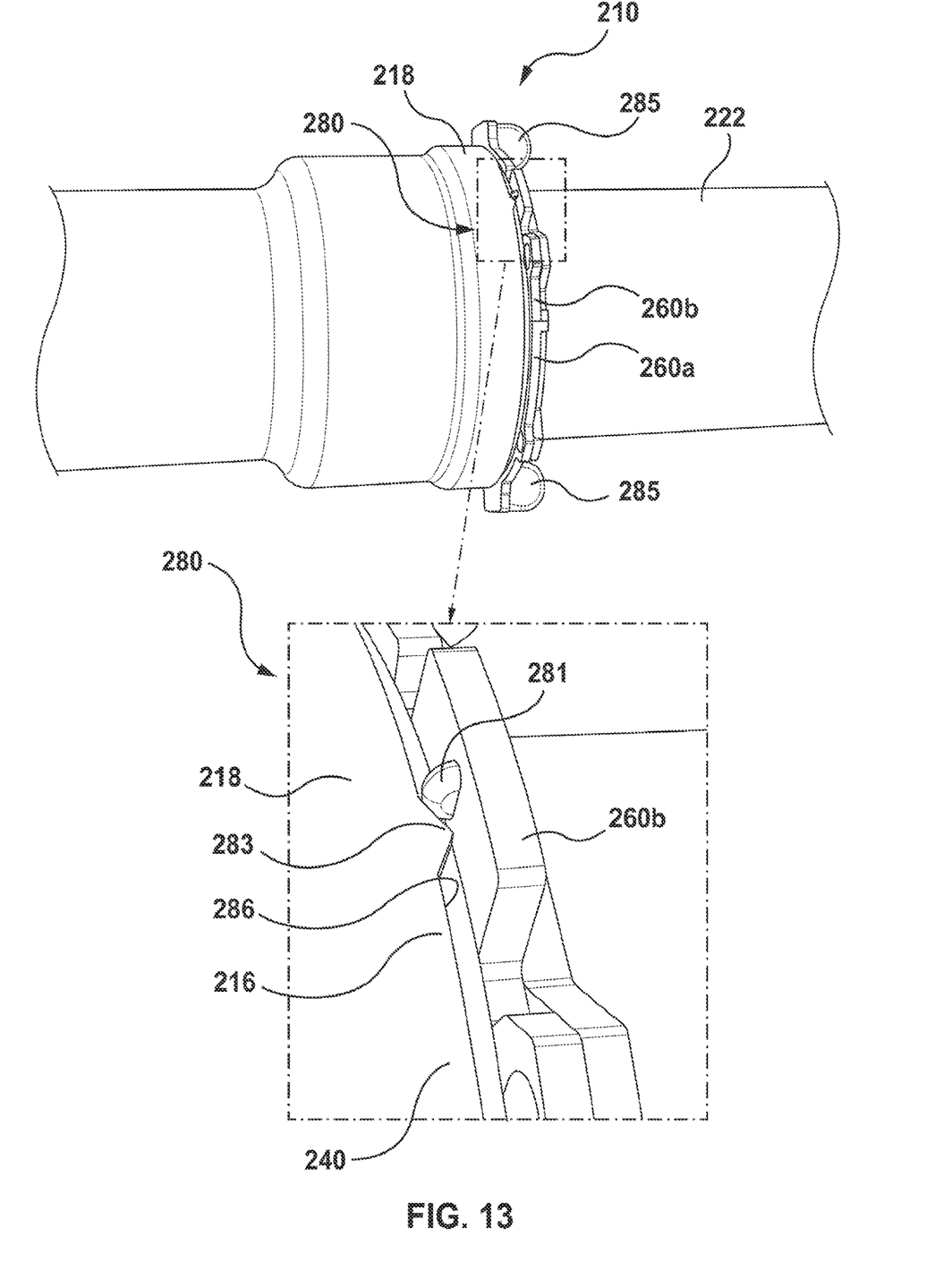
FIG. 13 illustrates an enlarged detailed view of the alternative lock feature of FIG. 12, the alternative lock feature shown in an engaged state.

With reference now to FIGS. 12 and 13, shown is a coupling 210 that incorporates an alternative lock feature 280. As all other structural aspects of the coupling 210 are as previously described having regard to the coupling 10, only difference will be noted. As shown, each of the first and second retainer portions 260a, 260b include a respective lock feature 280 (only one visible in the referenced figures). The lock feature 280 serves to prevent inadvertent loosening rotation once the first and second coupling members 218, 222 are fully assembled (coupled). As shown, the lock feature 280 includes a protuberance 281 configured to engage a respective ramped stop 283 on the terminal end 216 of the first coupling member 218. More specifically, the ramped stop 283 is arranged on an end face 286 of the terminal end 216 that forms the retainer lock wall 240. During tightening rotation of the retainer element 260 onto the threads of the retainer lock wall 240, the protuberance 281 included on each of the first and second retainer portions 260a, 260b are drawn longitudinally towards the terminal end 216 of the first coupling member 218, thereby causing each protuberance 281 to rotationally position beyond each respective ramped stop 283 (as shown in FIG. 13). In this way, by virtue of the mechanical interference between each protuberance/ramped stop pair, the retainer element 260 is prevented from rotating in the opposite (loosening) direction, thereby avoiding inadvertent loosening/detachment of the retainer element from the retainer lock wall 240. To release the retainer element 260, for example during repair/maintenance, the retainer element 260 is rotated with sufficient force to overcome the mechanical interference, therein forcing the protuberance 281 to pass over the ramped stop 283, therein permitting the retainer element 260 to fully rotationally disengage from the threads of the retainer lock wall 240. To facilitate rotation of the retainer element 260 during assembly/disassembly, at least one rotation tab 285 is included on each of the first and second retainer portions 260a, 260b.

A range of suitable materials may be used to form the first and second pipe elements 12, 14, in particular the socket 24 and plug 26 components, the selection of which will depend on the required performance characteristics. Exemplary materials include, but are not limited to polypropylene, polyethylene, nylon, polyphenylene ether (PPE), polyphenylene sulfide (PPS), and combinations thereof. The annular sealing element 56 and dust seal 90 will generally be selected from an elastomeric material, including but not limited to a thermoplastic elastomer (TPE), ethylene propylene diene monomer (EPDM), or the like, and for higher heat applications the material may be a fluoroelastomer material (FKM).

It is important to note that the construction and arrangement of the features in the various exemplary embodiments is illustrative only. Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications changes and omissions may also be made in design, operating conditions and arrangement of the various exemplary embodiments without departing from the present scope of the disclosure. It will also be understood that each feature of each embodiment discussed herein, and of each reference cited herein, can be used in combination with the features of any other combination. All patents and publications discussed herein are incorporated by reference herein in their entirety.

What is claimed is:

1. A coupling for interconnecting a first pipe element and a second pipe element, the coupling comprising:
   a first coupling member on the first pipe element;
   a second coupling member on the second pipe element, the second coupling member being dimensioned to receive therein the first coupling member;
   a retainer element having threads to engage the first coupling member to retain the first and second coupling members in a coupled state, wherein the retainer element includes a lock feature to prevent inadvertent loosening rotation; and
   a dust seal to prevent the ingress of dust or debris into the coupling, wherein the dust seal is configured as a two-part split seal, including a first dust seal portion and a second dust seal portion, the first and second dust seal portions being arranged to assemble around the second pipe element.

2. The coupling according to claim 1, wherein the first coupling member includes a socket, and wherein the second coupling member includes a plug.

3. The coupling according to claim 1, wherein the first coupling member is integrally formed with the first pipe element, and wherein the second coupling member is integrally formed with the second pipe element.

4. The coupling according to claim 2, further comprising an annular sealing element that provides a sealed interface between the socket and the plug.

5. The coupling according to claim 4, wherein the annular sealing element is seated within a circumferential channel on the first coupling member and wherein the annular sealing element is radially compressed through direct contact of the annular sealing element with each of the first coupling member and the second coupling member.

6. The coupling according to claim 2, wherein the arrangement of the plug within the socket and the dimensional characteristics of each of these features is such that the second pipe element is permitted a limited amount of longitudinal and angular movement relative to the first pipe element.

7. The coupling according to claim 2, further comprising a secondary sealing element positioned between an enlarged segment of the plug and an inner surface of the socket.

8. The coupling according to claim 1, wherein the threads of the retainer element engage cooperating threads on an inside surface of a retainer lock wall of the first coupling member.

9. The coupling according to claim 1, wherein the retainer element is a split retainer, including a first retainer portion and a second retainer portion.

10. The coupling according to claim 9, wherein the first and second retainer portions include alignment features to facilitate assembly of the retainer element about the second pipe element.

11. The coupling according to claim 10, wherein the alignment features include at least one alignment boss on the first retainer portion, and a corresponding alignment pocket on the second retainer portion.

12. The coupling according to claim 9, wherein the retainer element includes a fastening barb and a cooperating barb receiver at each interface between the first and second retainer portions.

13. The coupling according to claim 1, wherein the lock feature includes at least one pawl on the retainer element, the at least one pawl being arranged to lockingly engage respective lock teeth on a terminal end of the first coupling member.

14. The coupling according to claim 13, wherein the retainer element includes a release tab to facilitate releasing the pawl from the respective lock teeth.

15. The coupling according to claim 13, wherein a positive stop is included to limit the extent of flex during depression of the release tab.

16. The coupling according to claim 1, wherein the dust seal includes at least one alignment boss that aligns to a corresponding alignment pocket on the retainer element.

17. The coupling according to claim 1, wherein the lock feature includes at least one protuberance on the retainer element, the at least one protuberance being arranged to engage a respective ramped stop on a terminal end of the first coupling member.

18. The coupling according to claim 1, wherein an inner diameter of the first pipe element is identical to an inner diameter of the second pipe element.

* * * * *